United States Patent
McCollough et al.

(10) Patent No.: US 9,056,684 B2
(45) Date of Patent: Jun. 16, 2015

(54) ROTOR BLADE DE-ICING SYSTEM

(75) Inventors: James M. McCollough, Arlington, TX (US); Roger Aubert, Arlington, TX (US)

(73) Assignee: Textron Innovations Inc., Providence, RI (US)

(*) Notice: Subject to any disclaimer, the term of this patent is extended or adjusted under 35 U.S.C. 154(b) by 250 days.

(21) Appl. No.: 13/422,599

(22) Filed: Mar. 16, 2012

(65) Prior Publication Data

US 2012/0256053 A1   Oct. 11, 2012

Related U.S. Application Data

(60) Provisional application No. 61/473,189, filed on Apr. 8, 2011.

(51) Int. Cl.
*B64D 15/12* (2006.01)
*H05B 6/80* (2006.01)

(52) U.S. Cl.
CPC . *B64D 15/12* (2013.01); *H05B 6/80* (2013.01)

(58) Field of Classification Search
USPC .......... 244/133, 134 R, 134 D, 134 B, 134 E, 244/134 F; 60/39.093
See application file for complete search history.

(56) References Cited

U.S. PATENT DOCUMENTS

| | | | | |
|---|---|---|---|---|
| 4,054,255 A | * | 10/1977 | Magenheim | 244/134 F |
| 4,060,212 A | | 11/1977 | Magenheim | |
| 4,470,123 A | * | 9/1984 | Magenheim et al. | 702/172 |
| 4,688,185 A | * | 8/1987 | Magenheim et al. | 702/172 |
| 5,061,836 A | | 10/1991 | Martin | |
| 5,615,849 A | * | 4/1997 | Salisbury | 244/134 R |
| 6,206,325 B1 | * | 3/2001 | Nunnally | 244/134 E |
| 6,207,940 B1 | * | 3/2001 | Feher et al. | 219/679 |
| 6,787,744 B1 | * | 9/2004 | Feher et al. | 219/679 |
| 2003/0015524 A1 | | 1/2003 | Feher | |
| 2004/0173605 A1 | | 9/2004 | Feher et al. | |
| 2010/0101206 A1 | | 4/2010 | Haehner et al. | |

FOREIGN PATENT DOCUMENTS

CN    1224394    7/1999

OTHER PUBLICATIONS

Extended European Search Report from corresponding application 12162298.9-2422 issued from the European Patent Office dated Nov. 16, 2012, 6 pages.
Canadian Office Action dated Dec. 6, 2013 from counterpart EP App. No. 2772826.
European Search Report dated Apr. 23, 2013 from counterpart EP Appln. No. 12162298.9.
Chinese Office Action dated Apr. 17, 2014 from counterpart CN App. No. 201210096567.4.
Office Action dated Sep. 25, 2014 from counterpart CA App. No. 2,772,826.
Office Action dated Jan. 4, 2015 from counterpart CN App. No. 201210096567.4.

* cited by examiner

*Primary Examiner* — Timothy D Collins
*Assistant Examiner* — Jamie S Stehle
(74) *Attorney, Agent, or Firm* — James E. Walton; Richard G. Eldredge

(57) ABSTRACT

An aircraft includes a heat absorbent material carried by an airfoil susceptible to ice buildup and a transmitter spaced apart from the heat absorbent material. A method includes the process of transmitting the heat energy from the transmitter to the heat absorbent material that in turn warms the airfoil to break apart ice buildup.

7 Claims, 4 Drawing Sheets

ROTOR BLADE DE-ICING SYSTEM

CROSS REFERENCE TO RELATED APPLICATIONS

This application is a Non-provisional Application of U.S. Application No. 61/473,189, filed 8 Apr. 2011, titled "Helicopter Rotor Blade De-Icing Using Microwave Energy," which is hereby incorporated by reference for all purposes as if fully set forth herein.

BACKGROUND

1. Field of the Invention

The present application relates generally to de-icing systems, and more particularly, to de-icing systems for rotary aircraft.

2. Description of Related Art

Aircraft configured to operate in icy weather conditions must utilize one or more de-icing systems to break apart ice formed on the wings, rotors, and/or other airfoils used to create lift. Conventional rotary aircraft, such as helicopters, create lift with rotor blades susceptible to ice formations. The ice formations results in the aircraft losing lift, which in turn could cause the aircraft to crash.

Commonly known rotor blade de-icing systems utilize heaters carried by the rotor blades. This known embodiment includes a plurality of electrical wires that pass through the interior of the main rotor mast. The wires conductively couple the heaters to a power source. Running wires through the rotor mast is an undesired feature, resulting in the use of valuable space typically reserved for other systems.

Alternative embodiments could utilize a slip-ring having two conductive members that extend peripherally around the rotor shaft. This exemplary embodiment eliminates the need to run wires through the rotor mast. However, slip-rings increase the overall weight of the aircraft and result in additional maintenance costs.

Although great strides have been made in abovementioned de-icing systems, considerable shortcomings remain.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

Figure 1:
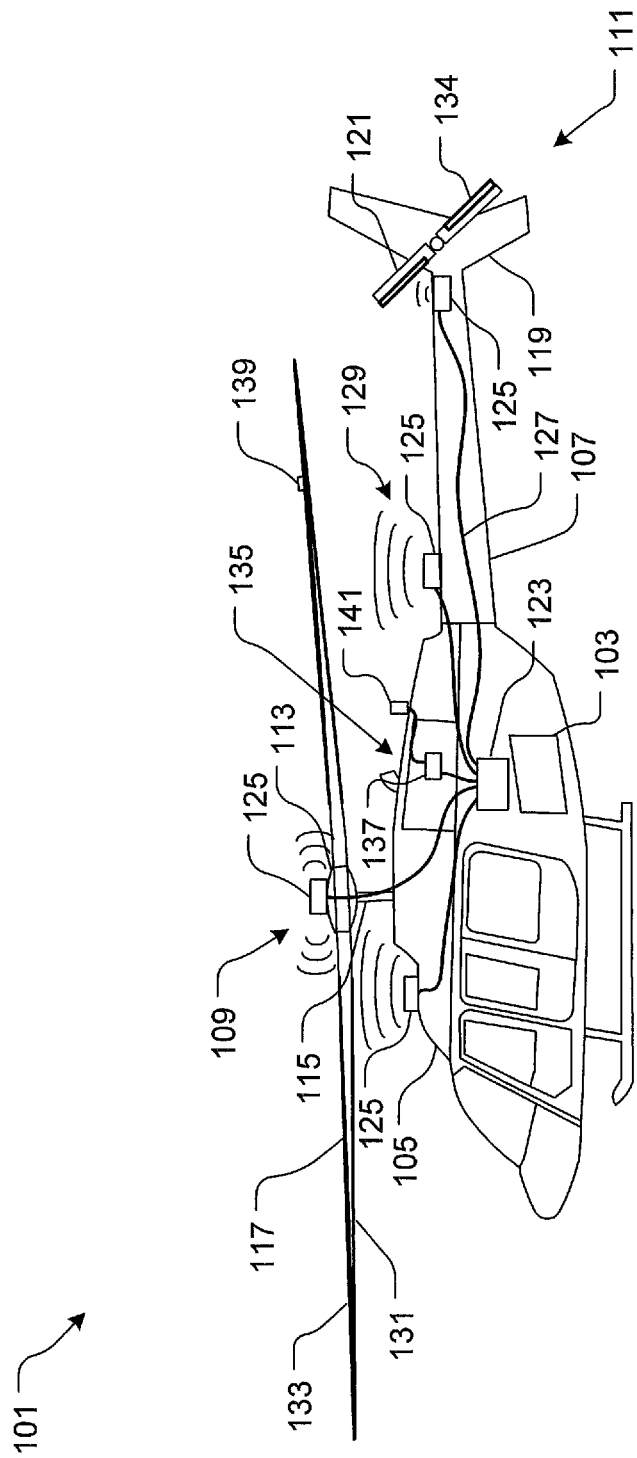
FIG. 1 is a side view of a rotary aircraft utilizing a de-icing system according to the preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the system and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The de-icing system of the present application overcomes common problems associated with conventional de-icing systems by removing ice formations without the need for wires passing through the rotor mast and/or the use of a slip-ring. The system includes the features of transmitting heat energy to a heat absorbing material carried on the rotor blades. Thereafter, the absorbed heat energy warms the rotor blades and subsequently breaks apart any ice formed thereon. Further discussion of these features is provided below with reference to the accompanying drawings.

Referring now to the drawings wherein like reference characters identify corresponding or similar elements throughout the several views, FIG. 1 shows a side view of an aircraft 101 utilizing a de-icing system 103 according a preferred embodiment of the present application.

In the illustrative embodiment, aircraft 101 is a helicopter; however, it will be appreciated that the de-icing system 103 could easily be adapted for use on other types of aircraft, for example, a tiltrotor aircraft. It is also contemplated utilizing the features discussed herein with other types of aircraft in lieu of a rotary aircraft. Although contemplated utilizing the de-icing system with rotary blades, the feature discussed herein can be employed with other types of airfoils such as a wing of a fixed wing aircraft.

Aircraft 101 includes a fuselage 105, a tail boom 107 attached to and extending from fuselage 105, a main rotor system 109 carried by fuselage 105, and a tail rotor 111 carried by tail boom 107. Main rotor system 109 includes a rotor hub 113, a rotor mast 115, and a plurality of rotor blades 117. Tail rotor 111 includes a vertical fin 119 and a plurality of tail rotor blades 121.

De-icing system 103 includes a power source 123 for providing energy to one or more transmitters 125. In the exemplary embodiment, aircraft 101 is shown having four transmitters 125 selectively positioned at various locations on the aircraft. Specifically, transmitters 125 are attached to fuselage 105, tail boom 107, tail rotor 111, and rotor hub 113. It should be appreciated that aircraft 101 could include more or less transmitters 125 in different embodiments.

Power source 123 conductively couples to transmitter 125 via one or more conductors 127. In the preferred embodiment, power source 123 is a source of electrical energy, for example, a generator driven by the aircraft engine (not shown). During operation, power source 123 provides electrical energy to the transmitter 125 that in turn transmits heat energy, as depicted with a plurality of waves 129, to one or more heat absorbent materials, for example, absorbent materials 131, 133, and 134, selectively positioned on or disposed within rotor blade 117 and/or tail rotor blade 121. The absorbent materials are configured to absorb and heat the blade, which in turn breaks apart any ice formations on rotor blade 117.

The exemplary embodiment illustrates the absorbent materials being secured to the rotor blades; however, it should be appreciated that the absorbent material can also be utilized on other components of the aircraft. For example, the absorbent material can be carried on the aircraft windshield, panels, fuselage, tail boom, and/or other areas of the aircraft susceptible to ice formations.

Transmitters 125 are preferably configured to transmit a form of heat energy such as microwave energy to the absorbent material; thus, the transmitter can be referred to as a heat transmitter and the absorbent material can be referred to as a heat absorbent material. It should be appreciated that microwave energy has been shown to be an effective means for transmitting and heating areas susceptible to ice formations. However, it should be understood that alternative forms of energy could be transmitted to the absorbent material in alternative embodiments.

De-icing system 103 is further provided with a control system 135 operably associated with power source 123. Control system 135 activates power source 123 upon detection of ice buildup, deactivates power source 123 as the rotor surface reaches a predetermined temperature, selectively transitions between activation and deactivation in a predetermined fashion, and/or is adapted to regulate the output, direction, and duration of heat energy transmitted by transmitter 125.

Control system 135 includes one or more of a control box 137 conductively coupled to power source 123, a first sensor 139, and a second sensor 141. Control box 137 includes the required software, hardware, switches, ports, and other electrical circuitry necessary to control de-icing system 103.

Sensor 139 is configured to sense and relay the sensed temperature readings to control box 137. In the contemplated embodiment, sensor 139 senses weather conditions likely to cause ice formations on the rotor blades, the blade temperature, and/or ice-buildup. For example, sensor could determine the outside air temperature, liquid water content, and/or water droplet size while flying through a cloud formation. Sensor 139 could also be utilized to determine the blade temperature, which is particularly desired to avoid overheating.

Sensor 141 is utilized to determine the location of the rotor blades relative to the transmitters. This feature allows control system 135 to selectively control the heat energy applied to the rotor blades as they pass over transmitter 125.

During operation, sensors 139 and 141 sense and relay the sensed data to control system 135 by conductive means, for example, conductive wires, and/or by wireless means.

The illustrative embodiment shows sensors 139 and 141 located on respective rotor blade 117 and fuselage 105; however, it will be appreciated that alternative embodiments could position these sensors in different locations. For example, sensor 139 could be attached to fuselage 105 in alternative embodiments.

Control system 135 is configured to control the amplitude of power and duration that the heat energy is transmitted to the absorbent material. In one embodiment, control system 135 activates transmitter 125 solely upon detection of rotor blade 117 as it passes near sensor 141. In another embodiment, control system 135 could be adapted to selectively activate transmitter 125 such that transmitter 125 is active during every third blade passage on a 4-bladed main rotor—this feature is particularly desired when regulating the heat applied to blade 117. Further, control system 135 is contemplated utilizing the required operably associated systems to automatically activate de-icing system 103 upon detection of ice buildup. An alternative embodiment would include the required switches and electrical components for manually activating de-icing system 103 upon detection of ice-buildup.

The illustrative embodiment depicts the various components and subsystems of de-icing system 103 attached to the outer surfaces of fuselage 105, tail boom 107, and tail rotor 111. However, it should be understood that de-icing system 103 is preferably carried within one or more of these structures. For example, power source 123, heat transmitter 125, conductors 127, control system 135, and other components of de-icing system 103 are preferably carried in one or more inner cavities of the aircraft 101 or disposed within the walls of fuselage 105 and tail boom 107.

Figure 2:
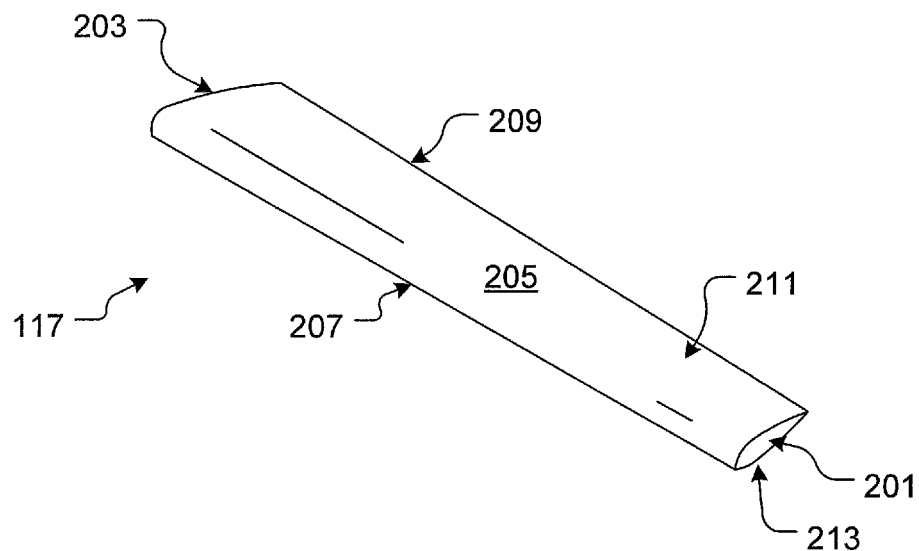
FIGS. 2 and 3 are oblique views of a rotor blade of the de-icing system of FIG. 1.
Figure 3:
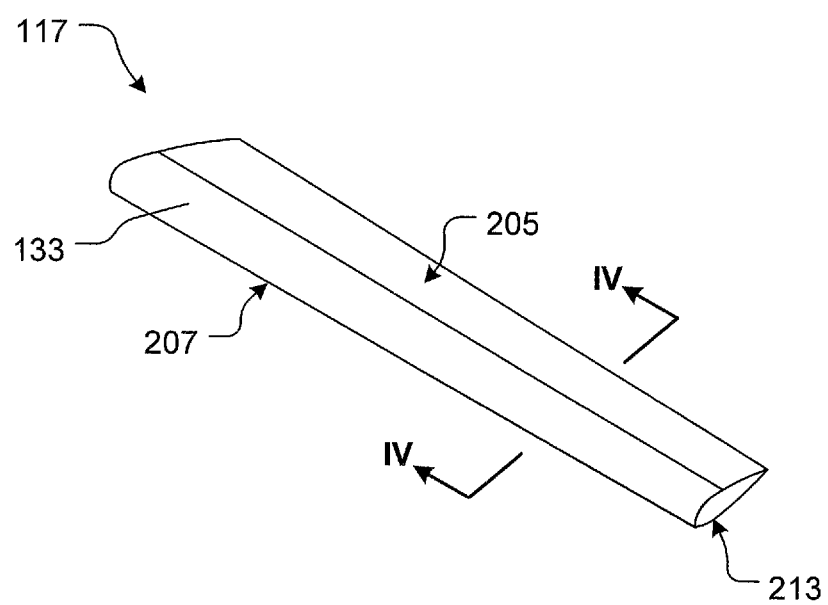

Referring now to FIGS. 2 and 3 in the drawings, oblique views of a portion of main rotor blade 117 is shown detached from aircraft 101. Rotor blade 117 includes a tip 201, a root 203, and a surface 205 extending from tip 201 and root 203. Surface 205 includes a leading edge 207 and a trailing edge 209. A suction surface 211 and a pressure surface 213 extend from leading edge 207 to trailing edge 209.

In FIG. 3, an oblique view of rotor blade 117 is shown with absorbent material 133 attached to surface 205. In the exemplary embodiment, absorbent material 133 is applied to leading edge 207, where rotor blade 117 is susceptible to ice buildup; however, it should be understood that the absorbent material can be applied to any surface on blade 117 in alternative embodiments.

In the contemplated embodiment, the absorbent material 133 is secured to the outer surface of the structures; however, it should be understood that alternative embodiments could include absorbent material being partially or fully disposed within the thickness of the structure. In one embodiment, the absorbent material could be positioned within a hollow cavity of airfoil or added as a layer sandwiched between one or more composite layers during manufacturing of a rotor blade.

Figure 4:
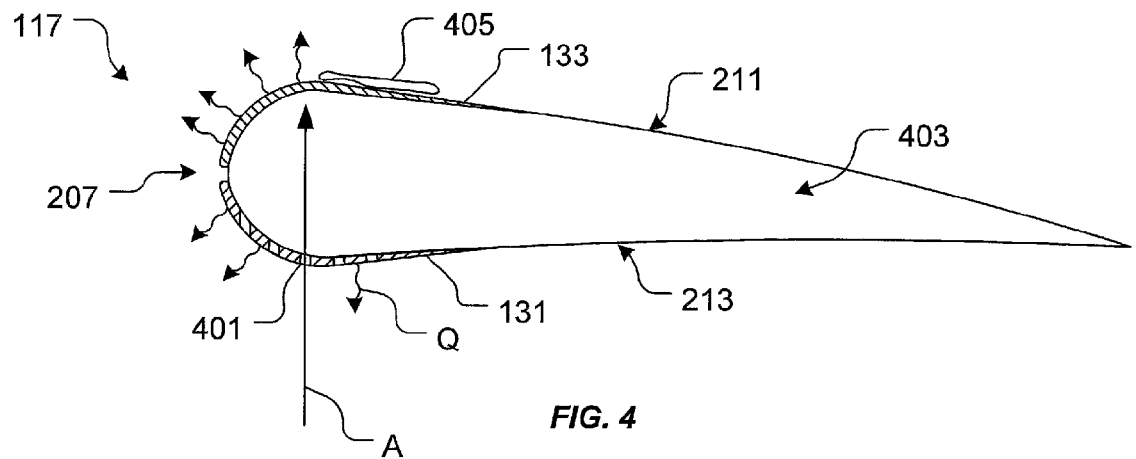
FIGS. 4-6 are cross-sectional views of different embodiments of the rotor blade of FIG. 3.
Figure 5:
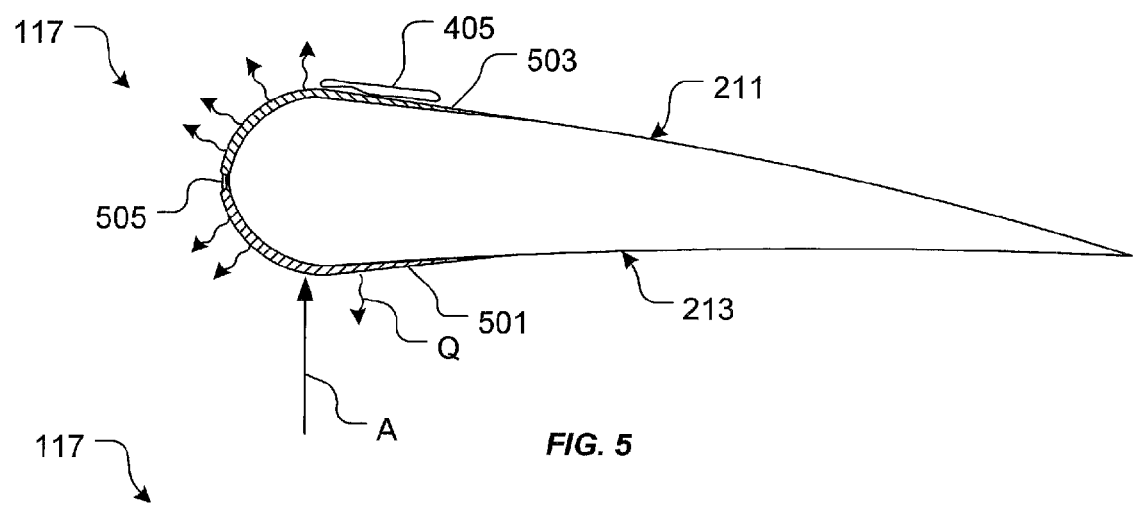
Figure 6:
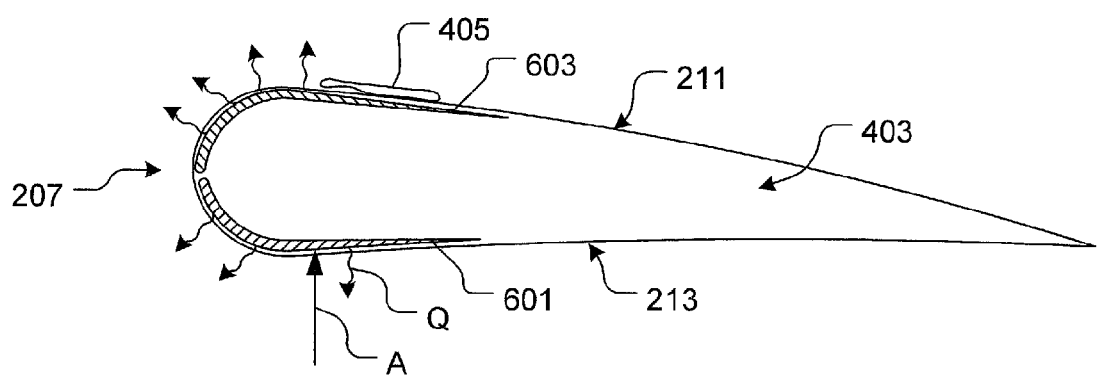

Referring to FIGS. 4-6, three different embodiments of a rotor blade with absorbent material are shown. The three embodiments illustrate various configurations of attaching the absorbent material to the rotor blades. Of course, it should be understood that other embodiments for securing the absorbent material to the blades are contemplated in alternative embodiments.

In FIG. 4, a transverse cross-sectional view of rotor blade 117 is shown taken at IV-IV of FIG. 3. In one preferred embodiment, absorbent material 131 includes a plurality of ports 401 extending through the thickness of material 131 and adapted to provide channeling means for heat energy to pass therethrough, as depicted with arrow A. Thereafter, the heat energy travels through the inner thickness 403 of rotor blade 117 and is absorbed by material 133 positioned on surface 205. Ports 401 are preferably channels extending lengthwise relative to the longitudinal length of rotor blade 117. However, it will be appreciated that ports 401 could include holes, slots, and/or other suitable geometric configurations in lieu of the preferred embodiment. As is shown, the heat energy are absorbed by material 131 and 133, which in turn heats the surfaces of the rotor blade 117, as depicted with arrows Q, to break apart any ice buildup 405 formed thereon.

In FIG. 5, an alternative embodiment is shown. FIG. 5 depicts a transverse cross-sectional view of rotor blade 117. In this embodiment, a first absorbent material 501 is applied to surface 213 and a second absorbent material 503 is applied to surface 205 of rotor blade 117. The two absorbent materials connect via a heat conductor 505, which transfers energy from material 501 to material 503.

In FIG. 6, another alternative embodiment is show. FIG. 6 depicts a transverse cross-sectional view of rotor blade 117.

In this embodiment, both the first heat absorbent material 601 and the second heat absorbent material 603 are fully disposed within the thickness 403 of rotor blade 117. Heat energy travels through surface 213 to reach materials 601 and 603. It will be appreciated that materials 601 and 603 can include conductor 505 and/or ports 401 discussed above.

Figure 7:
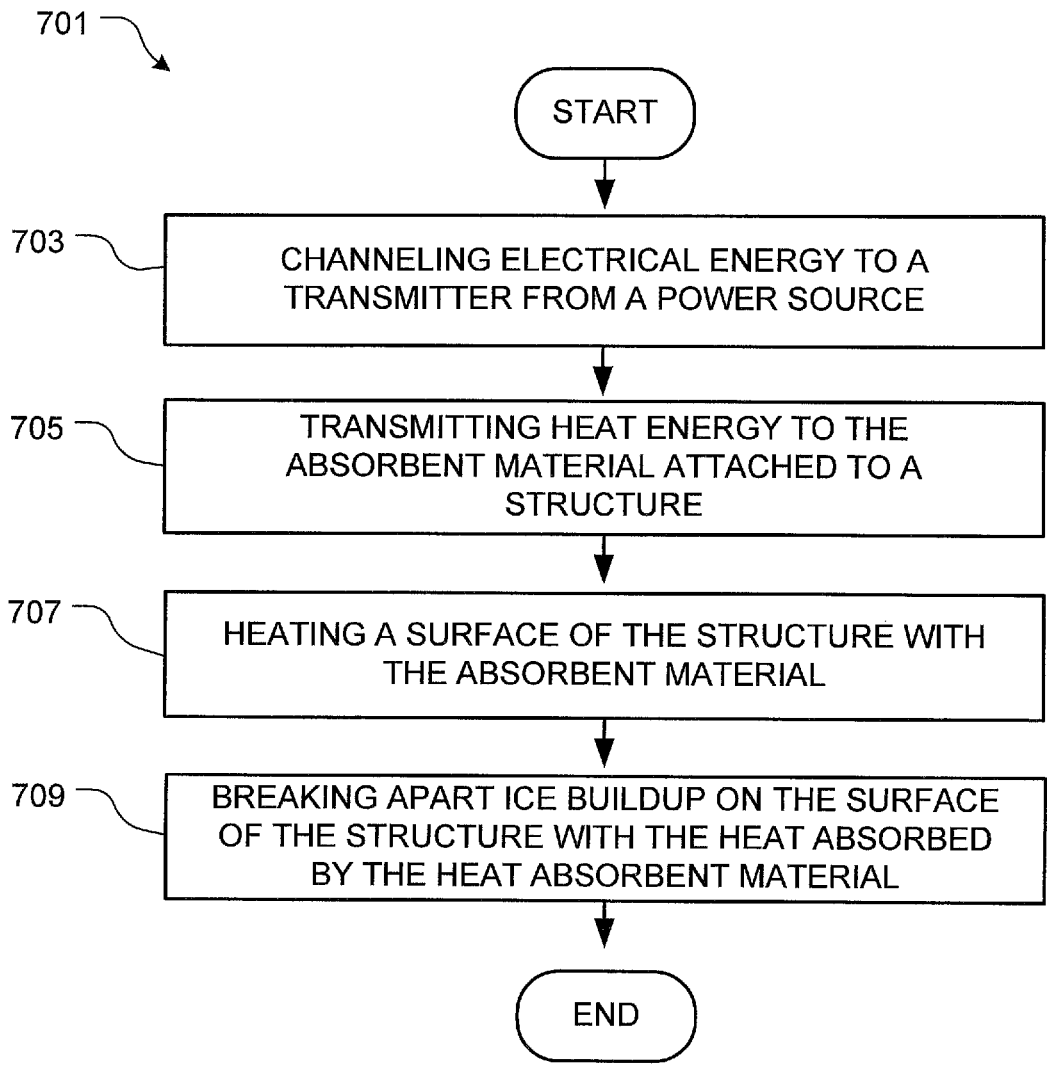
FIG. 7 is a flow chart showing the preferred method.

Referring next to FIG. 7 in the drawings, a flow chart 701 of the preferred de-icing method is shown. The method includes the process of creating and transferring energy to a transmitter, as depicted in box 703. Thereafter, the energy is transmitted to an absorbent material carried by the rotor blades, which in turn heats the rotor blades and breaks apart any ice buildup thereon, as depicted in boxes 705, 707, and 709.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An aircraft, comprising:
   an airfoil susceptible to an ice buildup;
   a heat absorbent material carried by the airfoil, the heat absorbent material, having:
      a first heat absorbent material secured to a suction surface of the airfoil;
      a second heat absorbent material secured to a pressure surface of the airfoil; and
      a port extending a length of the second heat absorbent material;
      wherein a portion of the heat energy passes through the port and is absorbed by the first heat absorbent material;
   a transmitter for transmitting heat energy to the heat absorbent material;
   a control system operably associated with the transmitter; and
   a sensor for detecting the presence of the airfoil as the airfoils passes over the sensor and, wherein the heat absorbent material absorbs the heat energy that in turn warms the airfoil and breaks apart ice buildup formed thereon.

2. The aircraft of claim 1, the control system comprising:
   a second sensor for detecting the ice buildup;
   wherein upon detection of the ice buildup, the second sensor relays the sensed information to the control system, which in turn activates the transmitter.

3. The aircraft of claim 2, wherein the second sensor detects conditions likely to create the ice buildup.

4. The aircraft of claim 1, further comprising:
   a heat conductor conductively coupling the first heat absorbent material to the second heat absorbent material;
   wherein the heat conductor transfers the heat energy from the second heat absorbent material to the first heat absorbent material.

5. The aircraft of claim 1, wherein the heat absorbent material is disposed within the thickness of the airfoil.

6. The aircraft of claim 1, wherein:
   the aircraft is a helicopter; and
   the airfoil is a rotor blade of the helicopter.

7. The aircraft of claim 1, wherein:
   the transmitter transmits microwave energy; and
   the heat absorbent material absorbs microwave energy.

* * * * *